United States Patent
Holt et al.

(10) Patent No.: US 7,836,309 B2
(45) Date of Patent: Nov. 16, 2010

(54) GENERIC EXTENSIBLE PRE-OPERATING SYSTEM CRYPTOGRAPHIC INFRASTRUCTURE

(75) Inventors: Erik Holt, Redmond, WA (US); Stefan Thom, Snohomish, WA (US); Shivaram H. Mysore, Kirkland, WA (US); Valerie Kathleen Bays, Redmond, WA (US); Carl Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 11/780,781

(22) Filed: Jul. 20, 2007

(65) Prior Publication Data

US 2009/0025067 A1 Jan. 22, 2009

(51) Int. Cl.
*G06F 21/00* (2006.01)
(52) U.S. Cl. ...................... 713/182; 380/287
(58) Field of Classification Search ............... 713/182; 711/163; 380/255; 340/5
See application file for complete search history.

(56) References Cited

U.S. PATENT DOCUMENTS

| | | | | |
|---|---|---|---|---|
| 6,111,517 | A * | 8/2000 | Atick et al. ................. | 340/5.83 |
| 6,708,273 | B1 | 3/2004 | Ober | |
| 6,892,304 | B1 | 5/2005 | Galasso | |
| 7,100,031 | B1 | 8/2006 | Reasor | |
| 7,127,579 | B2 * | 10/2006 | Zimmer et al. ............... | 711/163 |
| 7,603,562 | B2 * | 10/2009 | Flynn ......................... | 713/181 |
| 7,644,264 | B1 * | 1/2010 | Olsen .......................... | 713/2 |
| 2005/0111664 | A1 * | 5/2005 | Ritz et al. ................... | 380/255 |
| 2005/0138370 | A1 * | 6/2005 | Goud et al. ................. | 713/164 |
| 2005/0210467 | A1 | 9/2005 | Zimmer | |
| 2005/0223221 | A1 | 10/2005 | Proudler | |
| 2007/0061634 | A1 | 3/2007 | Marisetty | |
| 2008/0147945 | A1 * | 6/2008 | Zimmer et al. ............... | 710/260 |
| 2008/0148390 | A1 * | 6/2008 | Zimmer et al. ............... | 726/17 |
| 2008/0244257 | A1 * | 10/2008 | Vaid et al. .................... | 713/2 |

OTHER PUBLICATIONS

Klaus Kursawe; Analyzing trusted platform; communication; Year:2005; Katholieke Unversity Leuven.*
A Platform Level UPnP Framework Using Extensible Firmware Interface and Virtualization Technologies, http://www.priorartdatabase.com/IPCOM/000142338/.
Tianzhou Chen, AES Efficient implementation for extensible firmware interface, http://delivery.acm.org/10.1145/1170000/1167182/p376-chen.pdf?key1=1167182&key2=1427119711&coll=&dl=ACM&CFID=15151515&CFTOKEN=6184618.
Tianzhou Chen, Effectively implement AES for EFI/Tiano based on IA-32 Platform, http://ieeexplore.ieee.org/iel5/10728/33849/01611656.pdf?isNumber=.

* cited by examiner

*Primary Examiner*—Kambiz Zand
*Assistant Examiner*—Monjour Rahim
(74) *Attorney, Agent, or Firm*—Shook Hardy & Bacon LLP

(57) ABSTRACT

A cryptographic device protocol provides a generic interface allowing pre-OS applications to employ any of a variety of cryptographic devices within the pre-OS environment. The generic interface can be used independent of the specific cryptographic devices and is independent of the cryptographic or hashing algorithms used by each device. Cryptographic functions may be performed in the pre-OS environment by pre-OS applications communicating with cryptographic device drivers using the cryptographic device protocol that is independent of the cryptographic devices. Each cryptographic device may be identified by a unique device identifier and may have a number of keys available to it, with each key being identified by a unique key identifier.

20 Claims, 5 Drawing Sheets

| | Command | Argument In | Argument Out | Return | Description |
|---|---|---|---|---|---|
| 302 | GetProviderID() | None | UUID | Success/Failure | The UUID could be, for instance, a card ID or a generic device ID for a TPM or a biometric scanner. |
| 304 | AuthenticateProvider() | None | None | Success/Failure | The function will own screen and keyboard for the time of execution and undertake all necessary steps to authenticate the device or driver. It is responsible to restore the screen after completion. |
| 306 | EnumerateKeys() | None | UUID array | Number of keys | Returns all keys that are on the device or available to the driver. Driver has to return at least one key, even if the device does not support multiple keys. |
| 308 | SelectKey() | UUID | None | Success/Failure | Select the key for the next operations. For a TPM, the key could be loaded from the system volume. The driver owns screen and keyboard for the execution time if the key has to be authenticated. It is responsible to restore the screen after completion. |
| 310 | CreateKey() | Key Type | UUID | Success/Failure | A key is created and stored (Sign or Encryption Key). |
| 312 | DeleteKey() | UUID | None | Success/Failure | A stored key is deleted. |
| 314 | EncryptData() | Byte array | Byte array | Success/Failure | The specified data is encrypted with the selected key. |
| 316 | DecryptData() | Byte array | Byte array | Success/Failure | The specified data is decrypted with the selected key. |
| 318 | SignData() | Byte array | Byte array | Success/Failure | The specified data is signed with the selected key. |
| 320 | HashData() | Byte array | Byte array | Success/Failure | The specified data is hashed by the device or driver. |
| 322 | ProtectedStoreDir() | None | Identifier array | Number of identifiers | Return all identifiers of protected storage files. |
| 324 | ProtectedStoreWrite() | Identifier, Byte array | None | Success/Failure | Create or overwrite the protected storage file with the given identifier. |
| 326 | ProtectedStoreRead() | Identifier | Byte array | Success/Failure | Read the protected storage file with the given identifier. |
| 328 | ProtectedStoreDelete() | Identifier | None | Success/Failure | Delete the protected storage file with the given identifier. |
| 330 | RandomBuffer() | Length | Byte array | Success/Failure | Create a buffer with true random numbers, seeded in HW. |
| 332 | LogEvent() | Byte array | None | Success/Failure | The specified data is stored in the device log. This log could be stored on the System volume or in the device. The entries may be integrity protected by the device Driver. |
| 324 | ReleaseProvider() | None | None | Success/Failure | All transient data is wiped from memory. |

*FIG. 3.*

GENERIC EXTENSIBLE PRE-OPERATING SYSTEM CRYPTOGRAPHIC INFRASTRUCTURE

BACKGROUND

Security has become an increasingly important issue in the field of computing devices as computers have become ubiquitous in our society. It is often desirable to require authentication of users and/or systems in order to protect data, assets, and execution rights, for instance, from unauthorized access. Traditionally, the operating system (OS) environment has provided flexibility in the number and type of cryptographic and authentication devices that are available for security purposes. However, this flexibility of available cryptographic and authentication devices is not matched in the pre-OS environment. In particular, the pre-OS environment in many systems has traditionally employed BIOS firmware, which does not provide a flexible and dynamic infrastructure as all drivers are enclosed as a monolithic binary. A new generation of extensible firmware called Extensible Firmware Interface (EFI), though, now allows extending the firmware with drivers and APIs, thereby providing the possibility of a richer set of services available at pre-boot time. Nonetheless, restraints remain in the pre-OS environment making it difficult for pre-OS applications to take advantage of cryptographic devices and device drivers added to a computer system using EFI firmware.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments relate to a cryptographic device protocol that provides a generic interface allowing pre-OS applications to employ a variety of cryptographic devices without requiring the pre-OS applications to have code specific to each device. Instead, the generic interface can be used independent of the specific cryptographic devices and is independent of the cryptographic or hashing algorithms used by each device. By employing such an interface, all cryptographic devices appear the same to pre-OS applications. As a result, the pre-OS applications do not need to have knowledge of what type of cryptographic device they are using. Moreover, pre-OS applications do not need to include code specific to each cryptographic device to enable communication with and employ the different cryptographic devices. In embodiments, cryptographic functions may be performed in the pre-OS environment by pre-OS applications communicating with cryptographic device drivers using the cryptographic device protocol that is independent of the cryptographic devices. Each cryptographic device may be identified by a unique device identifier and may have a number of keys available to it, with each key being identified by a unique key identifier.

BRIEF DESCRIPTION OF THE DRAWINGS

The present invention is described in detail below with reference to the attached drawing figures, wherein:

FIG. 3 is a table detailing commands that may be employed within the generic cryptographic device protocol of embodiments of the present invention.

DETAILED DESCRIPTION

Figure 1:
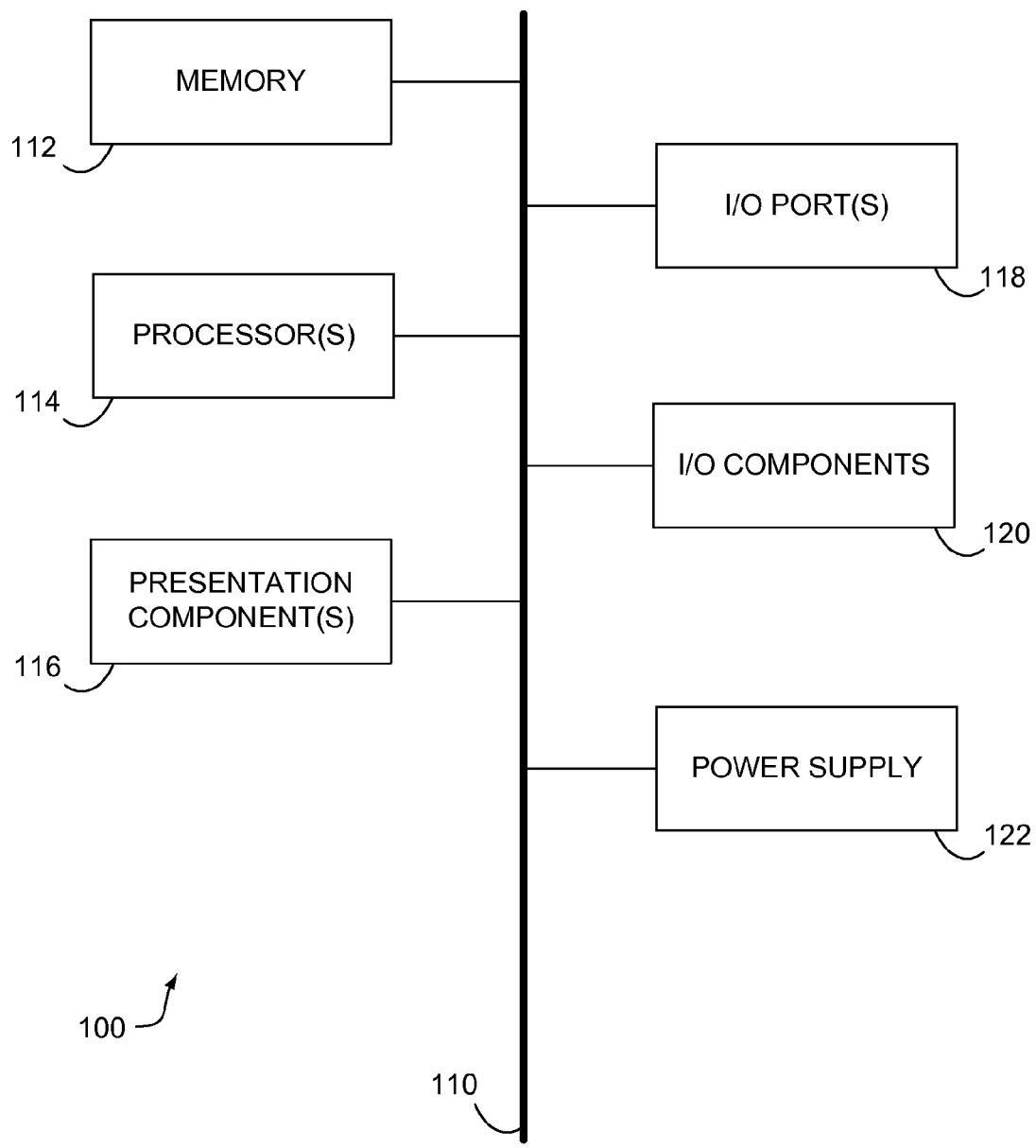
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a generic interface that allows for the use of any number and type of different cryptographic devices within the pre-OS environment. Embodiments provide a pluggable firmware infrastructure that is exposed to pre-OS applications in a generic way. As such, pre-OS applications may employ any of a variety of cryptographic devices in a common way without requiring the pre-OS applications to include code specific to each of the devices.

As indicated previously, the flexibility of security resources available to a computer system after an OS has booted has traditionally not been available in the pre-OS environment. However, it is desirable to provide rich and flexible security features in the pre-OS environment to further protect computer systems. While EFI has allowed firmware to be extended with drivers and APIs, thereby providing for the possibility of richer security resources at pre-boot time, a pre-OS application currently must incorporate potentially unstable code specific to each cryptographic device to take advantage of the extended drivers and APIs. In other words, to allow use of various cryptographic devices in the pre-OS environment using EFI, pre-OS applications would need to have specific knowledge about each device driver in order to use it. As a result, pre-OS applications would need code specific to each device driver. However, it is generally undesirable to have such extensibility in pre-OS applications as it is important to maintain stable code to ensure that the OS is properly booted.

Embodiments of the present invention allow pre-OS applications to employ a variety of cryptographic devices without requiring the pre-OS applications to have code specific to each device. Instead, embodiments employ a generic interface the can be used independent of the specific cryptographic devices. The interface is independent of the cryptographic or hashing algorithms used by each device. By employing such an interface, all cryptographic devices appear the same to pre-OS applications. As a result, the pre-OS applications do not need to have knowledge of what type of cryptographic device they are using. Moreover, pre-OS applications do not need to include code specific to each cryptographic device to enable communication with and employ the different cryptographic devices.

As used herein, the term "cryptographic device" applies to any hardware device (and associated device driver) or pure software solution used for authentication and/or cryptographic purposes. By way of example only and not limitation, cryptographic devices that may be enabled using embodiments of the present invention are listed in the table below and include: smart cards (using smart card readers); trusted platform modules (TPM), biometric readers, one-time password devices, external storage, passwords (pure software solutions), and network devices.

| Device | Comments |
|---|---|
| Smart card (fully ISO 7816 compliant) | Using CCID or ICCD smart card reader driver to access the card |
| Smart card (Vendor specific) | Using CCID or ICCD smart card reader driver to access the card |
| TPM | Using the existing EFI TPM driver |
| Biometric Reader | Secrets may be stored in the device or encrypted on the disk |
| One-Time-Password Devices | Using a network connection to a server backend |
| External storage | Pure software solution using a removable storage device for secrets |
| Password | Pure software solution using a long password seed that creates keys off of it. No storage required. |
| Network | Have crypto operations executed on a remote machine over a secured network layer like a protected VPN, IPSEC or a private LAN |

Accordingly, in one aspect of the invention, an embodiment is directed to one or more computer-readable media embodying computer-useable instructions for performing a method of facilitating communication between a pre-OS application and one or more cryptographic device drivers using a generic cryptographic device protocol to thereby enable one or more cryptographic functions to be performed for the pre-OS application. The method includes requesting and receiving, by the pre-OS application, a unique driver identifier for each of the cryptographic device drivers. The method also includes selecting, by the pre-OS application, one of the cryptographic device drivers based on a corresponding unique driver identifier. The method further includes requesting and receiving, by the pre-OS application, a unique key identifier for each of one or more keys available to the selected cryptographic device driver. The method still further includes selecting, by the pre-OS application, one of the keys based on a corresponding unique key identifier. The method also includes performing the cryptographic functions using the selected key.

In another embodiment of the invention, an aspect is directed to one or more computer-readable media embodying computer-useable instructions for implementing a method comprising performing a cryptographic function in a pre-OS environment using a cryptographic device identified by a unique device identifier and using a key available to the cryptographic device. The key is identified by a unique key identifier. A pre-OS application communicates with a cryptographic device driver associated with the cryptographic device to request performance of the cryptographic function by employing a generic cryptographic device protocol that is independent of a type of the cryptographic device.

A further aspect of the invention is directed to a computerized system. The system includes a processor for executing instructions from EFI firmware, one or more cryptographic device drivers, and a pre-OS application. The system also includes one or more cryptographic devices corresponding with the one or more cryptographic device drivers. The cryptographic devices perform cryptographic functions for the pre-OS application, and each of the cryptographic devices and its corresponding cryptographic device driver are identified using a unique device identifier. The system further includes one or more computer-readable media coupled to the processor, the one or more computer readable media embodying the EFI firmware, the cryptographic device drivers, and the pre-OS application. The cryptographic device drivers and the pre-OS application communicate using a generic cryptographic interface protocol that is independent of a type for each of the cryptographic device drivers.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 110 typically includes a variety of computer-readable media. Computer-readable media can be any available media that can be accessed by computing device 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
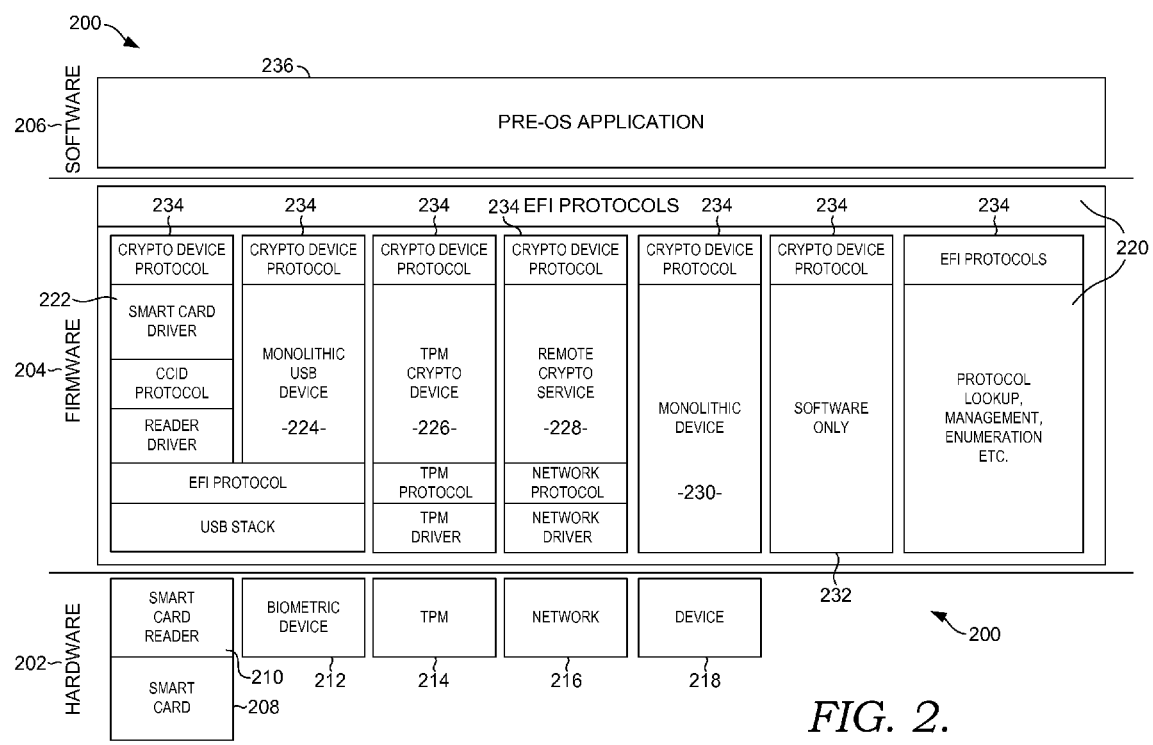
FIG. 2 is a block diagram showing a high level system in which embodiments of the present invention may be enabled.

Referring now to FIG. 2, a block diagram is provided illustrating a high level system 200 providing flexible and dynamic cryptographic functionality in the pre-OS environment in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, the system 200 may include various hardware 202, firmware 204, and software 206 components. Generally, the system 200 employs a generic cryptographic device protocol 234 to allow a pre-OS application 236 to communicate with any of the cryptographic device drivers 222, 224, 226, 228, 230, and 232 and employ any of the cryptographic devices 208, 210, 212, 214, 216, 218 in a common way without requiring the pre-OS application 236 to incorporate code specific to each. Although many other components of the system 200 are not shown, those of ordinary skill in the art will appreciate that such components and their interconnections are well known. Accordingly, additional details concerning components not shown in the system 200 are not further disclosed herein.

A variety of different hardware cryptographic devices 202 may be included in the system 200 for cryptographic purposes. The hardware cryptographic devices 202 shown in FIG. 2 include a smart card 208, a smart card reader 210, a biometric device 212, a TPM 214, a network cryptographic device 216, and a monolithic cryptographic device 218. It should be understood that the hardware cryptographic devices 202 shown in FIG. 2 are provided for illustrative purposes only and a variety of other devices may be employed within embodiments of the present invention.

The firmware 204 includes device drivers 222, 224, 226, 228, 230, each associated with one of the hardware cryptographic devices 202. The firmware 204 also includes a driver 232 for a pure software cryptographic solution. The firmware 204 further includes EFI firmware components 220, which provide a framework for extending services at pre-boot time. In particular, the EFI firmware components 220 allow dynamic drivers, including drivers 222, 224, 226, 228, 230, 232, to be loaded at pre-boot time. Additionally, the EFI firmware provides the necessary data channels to the actual hardware cryptographic devices 202. Each device driver is loaded at system startup, for instance, from the flash ROM or the EFI system volume. A driver list in an EFI variable may control which devices are to be loaded for startup. In embodiments, all loaded drivers may be measured by the TPM because drivers and the system as a whole whose measurements are not authorized may, in some cases, block further execution of the boot process.

The system 200 also employs a generic cryptographic device protocol 234 that allows the pre-OS application 236 to use any of the different cryptographic devices and device drivers in a common way. The pre-OS application 236 may generally be any application that is executed at pre-boot time before the operating system has loaded. By way of example only and not limitation, in the context of the WINDOWS® operating systems, the pre-OS application 236 may include Windows Boot Manager, winload.exe, and/or winresume.exe. The generic cryptographic device protocol 234 provides a generic object interface that can be used independent of the specific hardware device in the EFI infrastructure. Accordingly, the pre-OS application can identify the cryptographic devices using a universally unique identifier (UUID) associated with each and freely select the appropriate one. The interface provided is identical to the pre-OS application regardless of the type of cryptographic device.

Turning to FIG. 3, a table is provided listing commands that may be employed by the generic cryptographic device protocol to enable use of cryptographic devices in the pre-OS environment in accordance with an embodiment of the present invention. Initially, the GetProviderID( ) 302 command allows the pre-OS application to request and obtain the UUID for each cryptographic device. As such, the GetProviderID( ) 302 enables the pre-OS application to identify each cryptographic device available to the system and select an appropriate cryptographic device for a particular function.

Cryptographic devices usually require some form of authentication prior to allowing use of the devices. For instance, a smart card may require entry of a pin or a biometric device may require a fingerprint for authentication purposes.

The AuthenticateProvider( ) 304 is a command that allows for the authentication process to proceed. The AuthenticateProvider( ) 304 command allows the pre-OS application to be unaware of the authentication process required for a given cryptographic device. In response to the AuthenticateProvider( ) 304 command, the pre-OS application surrenders the screen and keyboard to the appropriate cryptographic device driver for authentication. Once the authentication process is completed, the screen and keyboard are restored and an indication of successful or failed authentication is provided.

Once a cryptographic device has been authorized, the device is available for encrypting data, decrypting data, signing data, and performing other security functions. The EnumerateKeys( ) 306 command allows all keys on a cryptographic device to be enumerated. Each key on a cryptographic device is identified using a UUID. Accordingly, a UUID array is returned in response to the EnumerateKeys( ) 306 command. In some instances, a cryptographic device may not support multiple keys, and only a single UUID is returned.

The SelectKey( ) 308 command provides for the selection of an appropriate key for use in cryptographic functions. In particular, a key is selected using the appropriate UUID corresponding with the key. Once the key has been selected, a variety of cryptographic functions may be performed. These functions may be enabled using the corresponding command. The EncryptData( ) 314 command allows specified data to be encrypted with the selected key. The DecryptData( ) 316 command allows specified data to be decrypted with the selected key. The SignData( ) 318 command allows specified data to be signed with the selected key. In some instances, hashing may be employed. Accordingly, the HashData( ) 320 commands allows specified data to be hashed by the cryptographic device.

In embodiments, some limited management commands may be provided in this pre-OS environment. For instance, key management functions may be provided in some embodiments of the invention. In particular, a CreateKey( ) 310 command may be provided for allowing the creation and storage of a key and assigning a UUID to the stored key. Additionally, a DeleteKey( ) 312 command may be provided for deleting a stored key based on an identified UUID associated with the key.

Some cryptographic devices may receive data and store it in a protected way. For example, a smart card may allow limited amounts of data to be stored on the smart card. Accordingly, a number of commands may be provided in some embodiments to allow for protected storage. In such embodiments, protected storage files on cryptographic devices are identified with a UUID. The ProtectedStoreDir( ) 322 command allows all identifiers of protected storage files on a cryptographic device to be returned. The ProtectedStoreWrite( ) 324 command allows data in a protected storage file with a given UUID to be created or overwritten. The ProtectedStoreRead( ) 326 command allows data in a protected storage file with a given UUID to be read. The ProtectedStoreDelete 328 command allows a protected storage file with a given UUID to be deleted.

Another command that may be employed by the cryptographic device protocol in embodiments is the RandomBuffer ( ) 330 command. Cryptographic devices typically offer random number generator functionality. The RandomBuffer( ) 330 command takes advantage of such functionally by allowing for the creation of a buffer with true random numbers.

In some embodiments, a device log may be used to store information regarding events occurring during a session. In particular, events during a cryptographic process may be logged using the LogEvent( ) 332 command. The log may be stored, for instance, on the system volume or in the cryptographic device. In some cases, the log entries may be integrity protected by the cryptographic device.

When a cryptographic process has been completed, the cryptographic device may be released using the ReleaseProvider( ) 334 command. In response to the command, all data used during the cryptographic session is wiped from memory to prevent access to any secrets used therein. Additionally, if the cryptographic device is needed for subsequent sessions, authentication will be required.

Figure 4A:
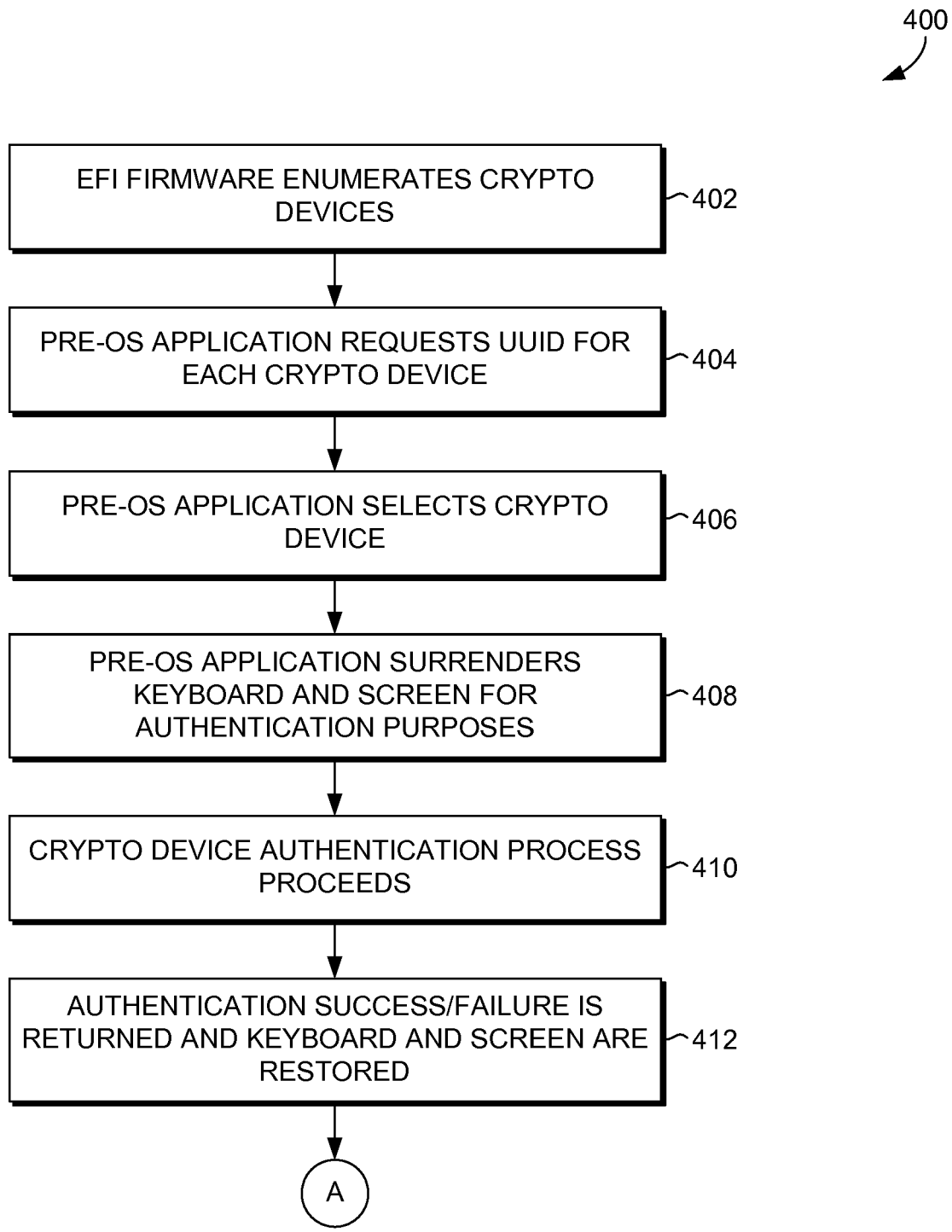
FIGS. 4A and 4B are a flow diagram showing an exemplary method for performing cryptographic functions in the pre-OS environment using a generic cryptographic device protocol in accordance with an embodiment of the present invention.
Figure 4B:
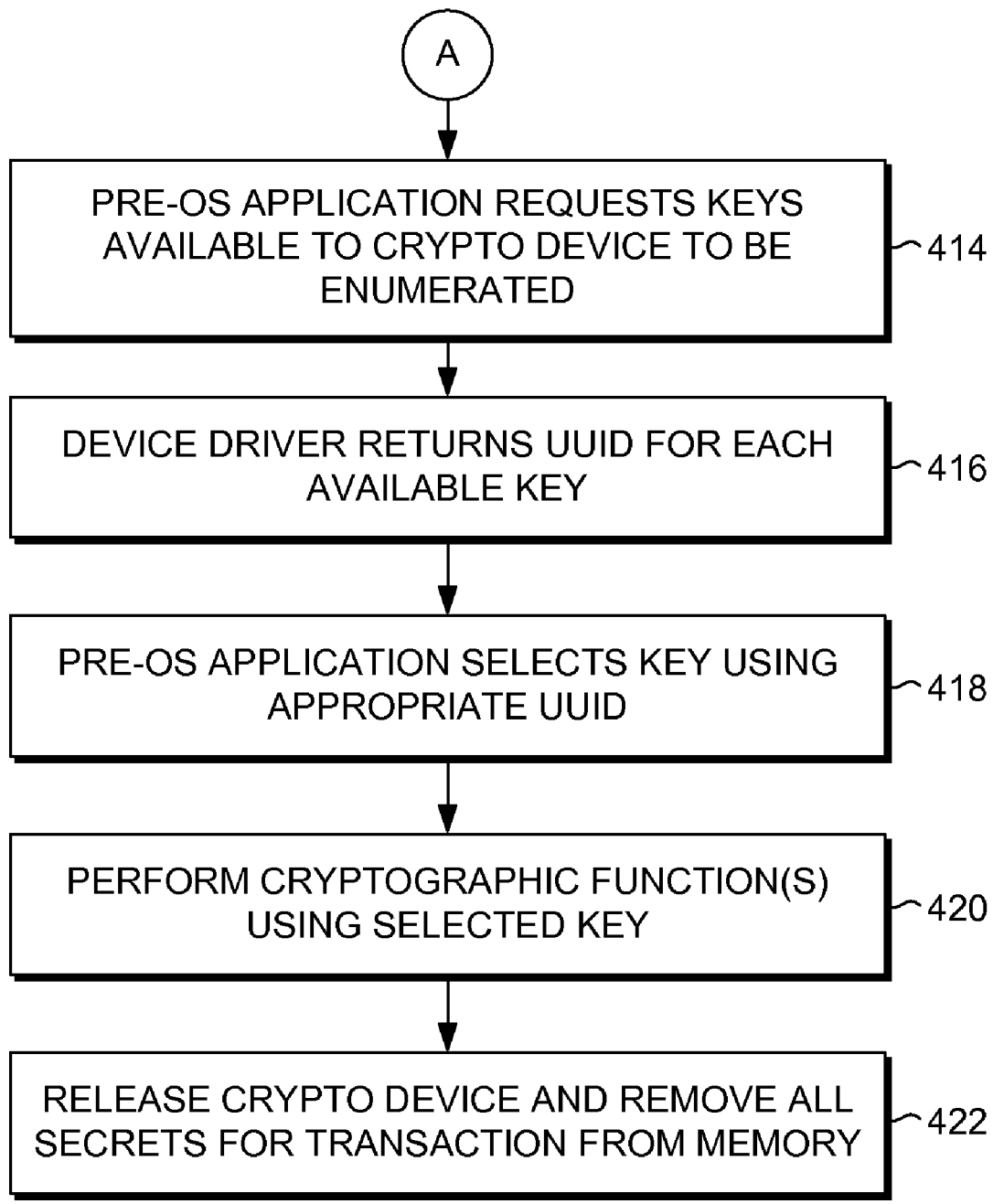

Referring now to FIGS. 4A and 4B, a flow diagram is provided showing an exemplary method 400 for performing cryptographic functions in the pre-OS environment using a generic cryptographic device protocol in accordance with an embodiment of the present invention. Initially, as shown at block 402, the EFI firmware enumerates all loaded cryptographic devices that are available to the pre-OS application. As indicated previously, any number and type of cryptographic devices may be employed within a computer system and made available to the pre-OS application. As shown at block 404, the pre-OS application issues the GetProviderID( ) command to each cryptographic device driver to request the UUID from each device. The pre-OS application then selects the cryptographic device driver having a UUID matching the one it is seeking, as shown at block 406.

As indicated previously, cryptographic devices typically require some authentication prior to proceeding with specific cryptographic functions. Accordingly, as shown at block 408, the pre-OS application calls the AuthenticateProvider( ) command and surrenders the keyboard and screen to the selected cryptographic device driver. As shown at block 410, the cryptographic device driver is then authenticated. In some cases, authentication for a cryptographic device may require some user interaction, such as requiring a user to enter a PIN or scan a fingerprint, for example. In other cases, authentication for a cryptographic device may occur without any user interaction.

Once authentication has been completed, an authentication success or failure is returned to the pre-OS application, and the keyboard and screen are restored, as shown at block 412. If an authentication success is returned, the pre-OS application calls the EnumerateKeys( ) command to request all keys available to the cryptographic device to be enumerated, as shown at block 414. In response, the device driver returns a UUID for each available key, as shown at block 416. Using the SelectKey( ) command at block 418, the pre-OS application may select a key for cryptographic operations using the appropriate UUID for the key.

As shown at block 420, the selected key is used to perform cryptographic functions. In some cases, the key may be used to encrypt, decrypt, and/or sign data, for instance, using the EncryptData( ), DecryptData( ), and/or SignData( ) commands. In some embodiments, protected storage may be employed. For instance, the pre-OS application may provide data for encryption and storage by the cryptographic device (e.g., using the ProtectedStoreWrite( ) command) or may request data corresponding with a given UUID (e.g., using the ProtectedStoreRead( ) command). After the cryptographic process has been completed, the cryptographic device is released using the ReleaseProvider( ) command, and all secrets from this transaction are removed from memory, as shown at block 422.

As can be understood, embodiments of the present invention provide a generic cryptographic device interface that allows pre-OS applications to use any number and type of cryptographic device in a generic way without requiring the pre-OS applications to include code specific to the cryptographic devices.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media embodying computer-useable instructions for performing a method of facilitating communication between a pre-operating system (OS) application and one of a plurality cryptographic device drivers associated with a plurality of cryptographic devices available to the pre-OS application using a generic cryptographic device protocol to thereby enable one or more cryptographic functions to be performed for the pre-OS application by one of the cryptographic devices, the method comprising:

requesting, by the pre-OS application via the generic cryptographic device protocol, a unique driver identifier for each of the plurality of cryptographic device drivers;

receiving, by the pre-OS application via the generic cryptographic device protocol, the unique device identifier for each of the plurality of cryptographic device drivers;

selecting, by the pre-OS application via the generic cryptographic device protocol, one of the cryptographic device drivers based on a corresponding unique driver identifier;

requesting and receiving, by the pre-OS application via the generic cryptographic device protocol, a unique key identifier for each of one or more keys available to the selected cryptographic device driver;

selecting, by the pre-OS application via the generic cryptographic device protocol, one of the one or more keys based on a corresponding unique key identifier; and causing the one or more cryptographic functions to be performed by a cryptographic device associated with the selected cryptographic device driver using the selected key.

2. The one or more computer storage media of claim 1, wherein the one or more cryptographic device drivers correspond with one or more of the following: a smart card, a smart card reader, a trusted platform module, a biometric reader, a one-time-password device, an external storage device, and a network cryptographic device.

3. The one or more computer storage media of claim 1, wherein the method further comprises issuing, by the pre-OS application, a command to authenticate the selected cryptographic device driver.

4. The one or more computer storage media of claim 3, wherein the method further comprises the pre-OS application surrendering keyboard and screen functionality to the selected cryptographic device driver.

5. The one or more computer storage media of claim 1, wherein the one or more cryptographic functions comprise one or more of the following: encrypting data, decrypting data, signing data, and hashing data.

6. The one or more computer storage media of claim 1, wherein the one or more cryptographic functions comprise one or more of the following: writing data to a protected storage file with a given file identifier on a cryptographic device associated with the selected cryptographic device driver; reading data from a protected storage file with a given file identifier on a cryptographic device associated with the selected cryptographic device driver; and deleting data from a protected storage file with a given file identifier on a cryptographic device associated with the selected cryptographic device driver.

7. The one or more computer storage media of claim 1, wherein the method further comprises releasing the selected cryptographic device driver after performing the one or more cryptographic functions.

8. The one or more computer storage media of claim 6, wherein the method further comprises erasing all secrets from memory.

9. One or more computer storage media embodying computer-useable instructions for implementing a method comprising employing a generic cryptographic device protocol to allow a pre-operating system (OS) application to employ a cryptographic device selected from a plurality of cryptographic devices available in a pre-OS environment to perform a cryptographic function in the pre-operating system (OS) environment, each cryptographic device being identified by a unique device identifier, the cryptographic function being performed using a key available to the cryptographic device, the key being identified by a unique key identifier, wherein the pre-OS application communicates with a cryptographic device driver associated with the selected cryptographic device to request performance of the cryptographic function by employing the generic cryptographic device protocol independent of a type of the selected cryptographic device.

10. The one or more computer storage media of claim 9, wherein the cryptographic device comprises one or more of the following: a smart card, a smart card reader, a trusted platform module, a biometric reader, a one-time-password device, an external storage device, and a network cryptographic device.

11. The one or more computer storage media of claim 9, wherein the method further comprises authenticating the cryptographic device prior to performing the cryptographic function.

12. The one or more computer storage media of claim 11, wherein authenticating the cryptographic device comprises the pre-OS application surrendering keyboard and screen functionality to the cryptographic device driver.

13. The one or more computer storage media of claim 9, wherein the cryptographic function comprises one or more of the following: encrypting data, decrypting data, signing data, and hashing data.

14. The one or more computer storage media of claim 9, wherein the cryptographic function comprises one or more of the following: writing data to a protected storage file with a given file identifier on the cryptographic device; reading data from a protected storage file with a given file identifier on the cryptographic device; and deleting data from a protected storage file with a given file identifier on the cryptographic device.

15. The one or more computer storage media of claim 9, wherein the method further comprises releasing the cryptographic device driver after performing the cryptographic function.

16. The one or more computer storage media media of claim 15, wherein the method further comprises erasing all secrets from memory.

17. A computerized system comprising:
- a processor for executing instructions from extensible firmware interface (EFI) firmware, a plurality of cryptographic device drivers, and a pre-operating system (OS) application;
- a plurality of cryptographic devices corresponding with the plurality of cryptographic device drivers, the cryptographic devices being available to perform cryptographic functions for the pre-OS application, wherein each of the cryptographic devices and its corresponding cryptographic device driver are identified using a unique device identifier; and
- one or more computer-readable media coupled to the processor, the one or more computer readable media embodying the EFI firmware, the plurality of cryptographic device drivers, and the pre-OS application, wherein the plurality of cryptographic device drivers and the pre-OS application communicate using a generic cryptographic interface protocol that is independent of a type for each of the plurality of cryptographic device drivers.

18. The computerized system of claim 17, wherein the plurality of cryptographic devices correspond with one or more of the following: a smart card, a smart card reader, a trusted platform module, a biometric reader, a one-time-password device, an external storage device, and a network cryptographic device.

19. The computerized system of claim 17, wherein the cryptographic functions comprise one or more of the following: encrypting data, decrypting data, signing data, and hashing data.

20. The computerized system of claim 17, wherein the cryptographic functions comprise one or more of the following: writing data to a protected storage file with a given file identifier on the cryptographic device; reading data from a protected storage file with a given file identifier on the cryptographic device; and deleting data from a protected storage file with a given file identifier on the cryptographic device.

* * * * *